United States Patent [19]
Shimada

[11] Patent Number: 5,917,571
[45] Date of Patent: Jun. 29, 1999

[54] ACTIVE MATRIX SUBSTRATE HAVING BENZOCYCLOBUTENE-CONTAINING INTERLAYER INSULATING FILM AND METHOD FOR FABRICATING SAME

[75] Inventor: Yoshinori Shimada, Yamatokoriyama, Japan

[73] Assignee: Sharp Kabushiki Kaisha, Osaka, Japan

[21] Appl. No.: 08/865,469

[22] Filed: May 29, 1997

[30] Foreign Application Priority Data

Jun. 3, 1996 [JP] Japan .................................. 8-140528

[51] Int. Cl.$^6$ .................................................. G02F 1/1333
[52] U.S. Cl. .................................... 349/138; 349/122
[58] Field of Search ..................................... 349/122, 138

[56] References Cited

U.S. PATENT DOCUMENTS

| | | | |
|---|---|---|---|
| 5,003,356 | 3/1991 | Wakai et al. | 357/4 |
| 5,585,951 | 12/1996 | Noda et al. | 349/122 |
| 5,641,974 | 6/1997 | den Boer et al. | 257/59 |
| 5,721,601 | 2/1998 | Yamaji et al. | 349/138 |

FOREIGN PATENT DOCUMENTS

| | | |
|---|---|---|
| 58-172685 | 10/1983 | Japan . |
| 4-163528 | 6/1992 | Japan . |

OTHER PUBLICATIONS

Hirohisa, Patent Abstract Active Matrix Substrate, (04068318 A) Mar. 4, 1992.
Kenichi, Patent Abstract Active Matrix Substrate (04163528 A) Jun. 9, 1992.
Perettie, et al. *Benzocyclobutene as a Planarization Overcoat for Flat Panel Displays*. Asia Display, vol. 721, 1995, 721–724.

*Primary Examiner*—Hung Xuan Dang
*Assistant Examiner*—James A. Dudek
*Attorney, Agent, or Firm*—David G. Conlin; George W. Neuner

[57] ABSTRACT

An active matrix substrate of the present invention includes: an insulating substrate; scanning bus lines and signal bus lines provided on the insulating substrate so as to cross each other; switching elements provided in the vicinity of crossing portions of the scanning bus lines and the signal bus lines. The active matrix substrate also includes an interlayer insulating film covering the switching elements, the scanning bus lines and the signal bus lines; and pixel electrodes provided on the surface of the interlayer insulating film opposite to the insulating substrate, each of the pixel electrodes being electrically connected with each of the switching elements via a contact hole penetrating the interlayer insulating film. The interlayer insulating film includes a first layer containing benzocyclobutene and a second layer containing silicon dioxide obtained by treating the surface of the first layer with oxygen plasma.

17 Claims, 6 Drawing Sheets

ACTIVE MATRIX SUBSTRATE HAVING BENZOCYCLOBUTENE-CONTAINING INTERLAYER INSULATING FILM AND METHOD FOR FABRICATING SAME

BACKGROUND OF THE INVENTION

1. Field of the Invention

The present invention relates to an active matrix substrate and a method for fabricating the same. More particularly, the present invention relates to an active matrix substrate provided with an interlayer insulating film having first and second layers containing a specific compound respectively, and a method for fabricating the same.

2. Description of the Related Art

Conventionally, a liquid crystal display device has been used for a variety of applications (e.g., a plane display for a television set, a personal computer, office automation (OA) equipment and the like). An active matrix type liquid crystal display device is known as the liquid crystal display device. The active matrix type liquid crystal display device includes a pair of substrates opposing each other and a liquid crystal layer interposed therebetween, one of the substrates being provided with switching elements such as thin film transistors (TFTs) and an electric field independently applied to the liquid crystal layer in each pixel.

FIG. 5 is a schematic view illustrating an exemplary configuration of a conventional active matrix substrate used for the active matrix type liquid crystal display device.

The active matrix substrate includes TFTs 23 as switching elements and pixel capacitors 22 in a matrix shape. Gate bus lines 24, which function as scanning lines and to control the TFTs 23, are connected to the gate electrodes of the TFTs 23 so as to drive the TFTs. Source bus lines 26, which function as signal lines and input signals to the TFTs 23, are connected to the source electrodes of the TFTs 23 so as to input video signals (data signals) to the TFTs. The gate bus lines 24 (which run parallel with one another) and the source bus lines 26 (which run parallel with one another) cross each other at substantially right angles. One of the pair of terminals of each pixel capacitor 22 is connected with the drain electrode of a respective TFT 23. The other terminal of the pixel capacitor 22 is connected with pixel capacitor bus line 25 so as to be connected with a counter electrode provided on a counter substrate. A liquid crystal display device includes the active matrix substrate and the counter substrate opposing each other, and a liquid crystal layer interposed therebetween including liquid crystal as a display medium.

Referring now to FIGS. 6 to 8, a liquid crystal display device using the above-mentioned active matrix substrate will be described in detail. FIG. 6 is a schematic plan view of the liquid crystal display device. FIG. 7 is a cross-sectional view taken along line VII—VII of FIG. 6, and FIG. 8 is a cross-sectional view taken along line VIII—VIII of FIG. 6.

The active matrix substrate includes a plurality of gate bus lines 24 running parallel with one another and a plurality of source bus lines 26 running parallel with one another. The source bus lines 26 cross the gate bus lines 24 at substantially right angles on a transparent insulating substrate 1 (FIGS. 7 and 8). A pixel electrode 11 is provided for each rectangular region (surrounded by the adjacent gate bus lines 24 and the adjacent source bus lines 26) so as to form a matrix of the pixel electrodes. A branch extends from the gate bus line 24 at each region where the pixel electrode 11 is formed, so as to form a gate electrode 2 of a TFT 23 as a switching element. A gate insulating film 3 (FIGS. 7 and 8) is formed so as to cover the gate electrodes 2, the gate bus lines 24, and the source bus lines 26.

Turning to FIG. 8, each TFT 23 is essentially composed of the gate electrode 2, the gate insulating film 3 covering the gate electrode 2, a semiconductor layer 4 formed on the portion of the gate insulating film 3 corresponding to the gate electrode 2, a channel protecting layer 5 formed on the center portion of the semiconductor layer 4, $n^+$-Si layers 6a and 6b formed to cover both sides of the channel protecting layer 5 and the exposed portions of the semiconductor layer 4, an ITO film 7a and a metal layer 8a sequentially formed on the $n^+$-Si layer 6a, and an ITO film 7b and a metal layer 8b sequentially formed on the $n^+$-Si layer 6b. The $n^+$-Si layers 6a and 6b function as a source electrode and a drain electrode of each TFT 23, respectively. The ITO film 7a and the metal layer 8a function as the source bus lines 26 in combination. The ITO film 7b and the metal layer 8b function as a connecting electrode in combination, so as to connect the drain electrode of each TFT 23 with each pixel electrode 11. The ITO film 7b extends to the portion above auxiliary capacitor signal lines 19 (FIG. 7) and an overlapped portion of the ITO film 7b, the gate insulating film 3 and the auxiliary capacitor signal lines 19 forms an auxiliary capacitor.

Furthermore, an interlayer insulating film 9 made of an organic insulating material is formed so as to cover the TFTs 23, the gate bus lines 24, and the source bus lines 26. A transparent conductive film 11 as pixel electrodes is formed on the interlayer insulating film 9. Each pixel electrode is electrically connected with the drain electrode 6b of each TFT 23 via a contact hole 10 penetrating the interlayer insulating film 9 and the ITO film 7b. Furthermore, an alignment film 16 is provided on the entire surface of the substrate so as to cover the pixel electrodes 11.

A liquid crystal display device 700 includes the active matrix substrate and the counter substrate opposing each other, and a liquid crystal layer 17 interposed therebetween including a liquid crystal as a display medium. The counter substrate can be a color filter substrate provided with a light shielding plate 13, a color filter 14, a counter electrode 15 and an alignment film 16 on a transparent insulating substrate 12.

The active matrix substrate having the above-mentioned configuration is disclosed in, for example, Japanese Laid-Open Patent Publication No. 58-172685. According to the active matrix substrate, since the interlayer insulating film is provided between the gate and source bus lines and the pixel electrodes, the pixel electrodes can be formed on the portion of the interlayer insulating film corresponding to the portion where the gate and source bus lines are formed. As a result, a liquid crystal display device having a high aperture ratio can be obtained. Furthermore, defects of a liquid crystal alignment can be prevented by shielding electric fields due to the gate and source bus lines with the interlayer insulating film.

However, the interlayer insulating film made of an organic insulating material has the following problems. When the transparent conductive film (e.g., ITO film) as pixel electrodes is formed directly on the interlayer insulating film made of an organic insulating material, separation between the ITO film and the interlayer insulating film is likely to result. This is because adhesion of the interlayer insulating film to the ITO film is insufficient. The separation between the films causes reduction of yield of the active matrix substrate. Consequently, the fabrication cost of the active matrix substrate is increased thereby making the liquid crystal display device using such an active matrix substrate expensive.

In order to overcome the above-mentioned problems, an active matrix substrate using a combination of an organic insulating film and an inorganic insulating film as an interlayer insulating film has been proposed in Japanese Laid-Open Patent Publication No. 4-163528. According to the active matrix substrate disclosed therein, since the inorganic insulating film is provided between the organic insulating film and the ITO film, separation between the ITO film and the interlayer insulating film can be prevented.

However, the fabrication of such an active matrix substrate is considerably complicated. In particular, the fabrication of the active matrix substrate requires independently forming the organic and inorganic films and independently forming contact holes in the organic and inorganic films. Therefore, the fabrication of this active matrix substrate requires the steps of forming the organic and inorganic films respectively, and photolithographing and etching the organic and inorganic film so as to form contact holes respectively. In other words, the fabrication of this active matrix substrate requires six steps for forming the interlayer insulating film. As a result, the active matrix substrate still has the problem that a liquid crystal display device using such an active matrix substrate is expensive.

In view of the above-mentioned problems, it is desired to provide an active matrix substrate capable of realizing a liquid crystal display device having a high aperture ratio and a satisfactory liquid crystal alignment, and a method for easily and inexpensively fabricating such an active matrix substrate.

SUMMARY OF THE INVENTION

An active matrix substrate according to the present invention includes: an insulating substrate; scanning bus lines and signal bus lines provided on the insulating substrate so as to cross each other; switching elements provided in the vicinity of crossing portions of the scanning bus lines and the signal bus lines; an interlayer insulating film covering the switching elements, the scanning bus lines and the signal bus lines; and pixel electrodes provided on the surface of the interlayer insulating film opposite to the insulating substrate, each of the pixel electrodes being electrically connected with each of the switching elements via a contact hole penetrating the interlayer insulating film. The interlayer insulating film includes a first layer containing benzocyclobutene and a second layer containing silicon dioxide obtained by treating the surface of the first layer with oxygen plasma.

Alternatively, the interlayer insulating film provided in an active matrix substrate according to the present invention includes a first layer containing photosensitive resin and a second layer containing silicon dioxide obtained by treating silazane compound applied onto the surface of the first layer with oxygen plasma, the first layer and the second layer being provided in this order from the insulating substrate side.

In one embodiment of the invention, the silazane compound is hexamethyldisilazane.

In another embodiment of the invention, the photosensitive resin is acrylic resin.

In still another embodiment of the invention, the silazane compound is hexamethyldisilazane and the photosensitive resin is acrylic resin.

According to another aspect of the invention, a method for fabricating an active matrix substrate is provided. The method includes the steps of: forming scanning bus lines, signal bus lines and switching elements on an insulating substrate; applying benzocyclobutene onto the insulating substrate, exposing predetermined portions of the applied benzocyclobutene to light, and developing and thermally curing the exposed benzocyclobutene so as to form a first layer covering the scanning bus lines, the signal bus lines and the switching elements, and contact holes penetrating the first layer; treating the surface of the first layer with oxygen plasma to form a second layer containing silicon dioxide so as to obtain an interlayer insulating film having a double-layered structure; and forming pixel electrodes on the surface of the interlayer insulating film opposite to the insulating substrate so as to be connected with the switching elements via the contact holes.

In one embodiment of the invention, the oxygen plasma treatment is performed in an apparatus for forming the pixel electrodes.

Alternatively, the method includes the steps of: forming scanning bus lines, signal bus lines and switching elements on an insulating substrate; applying photosensitive resin onto the insulating substrate, exposing predetermined portions of the applied photosensitive resin to light, and developing and thermally curing the exposed photosensitive resin so as to form a first layer covering the scanning bus lines, the signal bus lines and the switching elements, and contact holes penetrating the first layer; applying silazane compound onto the surface of the first layer, and treating the silazane compound with oxygen plasma to form a second layer containing silicon dioxide so as to obtain an interlayer insulating film having a double-layered structure; and forming pixel electrodes on the surface of the interlayer insulating film opposite to the insulating substrate so as to be connected with the switching elements via the contact holes.

In one embodiment of the invention, the silazane compound is applied just before or immediately after thermally curing the photosensitive resin.

In another embodiment of the invention, the silazane compound is hexamethyldisilazane.

In still another embodiment of the invention, the photosensitive resin is acrylic resin.

In still another embodiment of the invention, the silazane compound is hexamethyldisilazane and the photosensitive resin is acrylic resin.

Thus, the invention described herein makes possible the advantages of (1) providing an active matrix substrate capable of realizing a liquid crystal display device having a high aperture ratio and a satisfactory liquid crystal alignment, (2) providing an inexpensive active matrix substrate with high yield, and (3) providing a method for easily and inexpensively fabricating such an active matrix substrate.

These and other advantages of the present invention will become apparent to those skilled in the art upon reading and understanding the following detailed description with reference to the accompanying figures.

DESCRIPTION OF THE PREFERRED EMBODIMENTS

Figure 1:
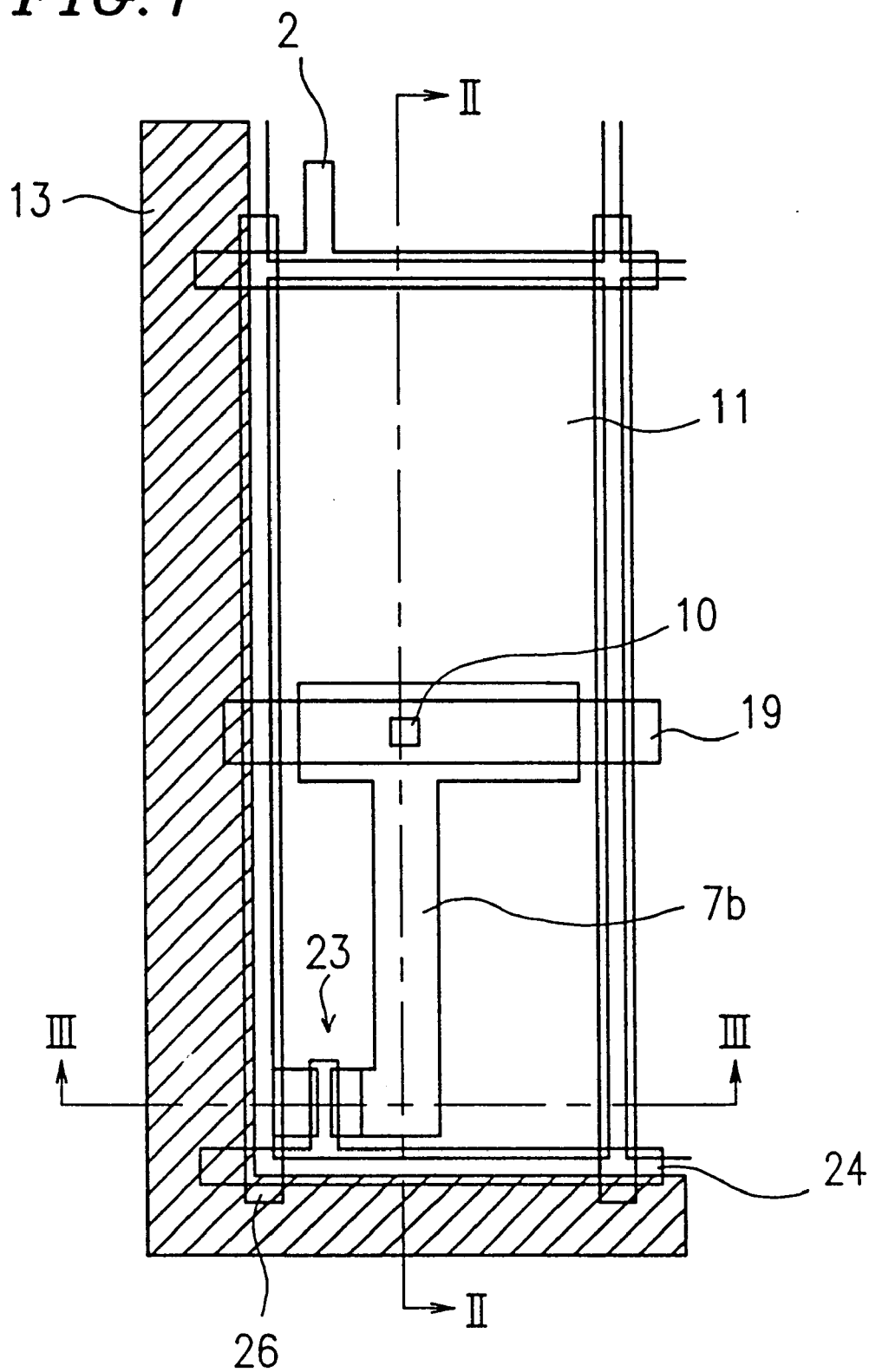
FIG. 1 is a schematic plan view of a liquid crystal display device using a preferred embodiment of an active matrix substrate according to the present invention.

Hereinafter, preferred embodiments of the present invention will be described with reference to the accompanying drawings. In the drawings, components having the same functions are represented by the same reference numerals.

EMBODIMENT 1

Figure 2:
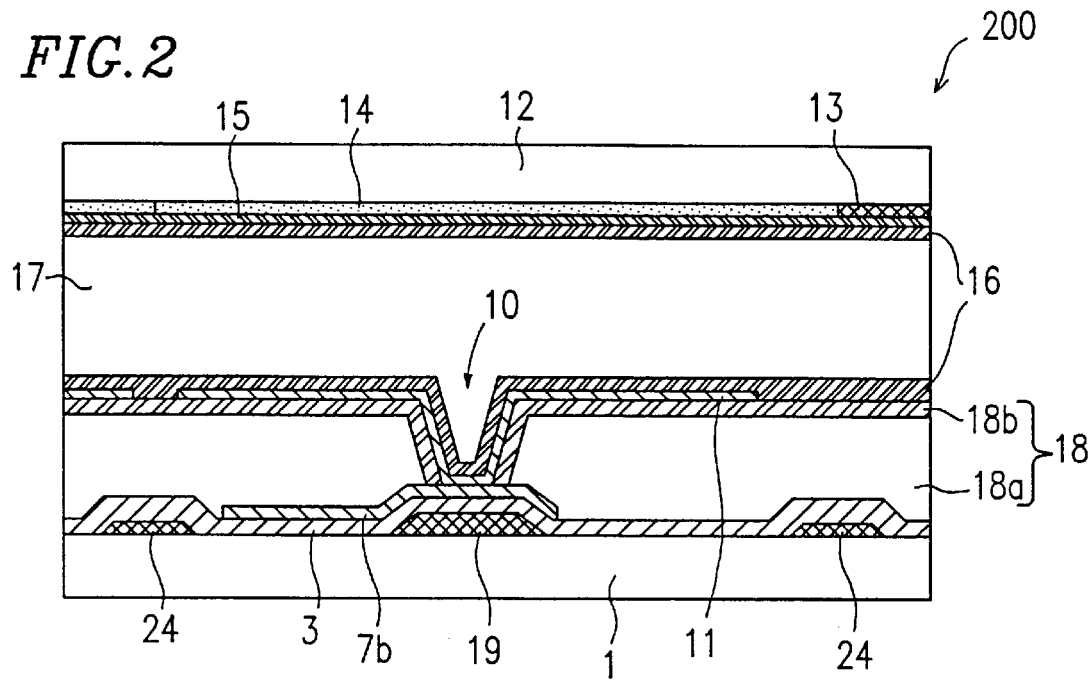
FIG. 2 is a cross-sectional view of the liquid crystal display device taken along line II—II of FIG. 1.
Figure 3:
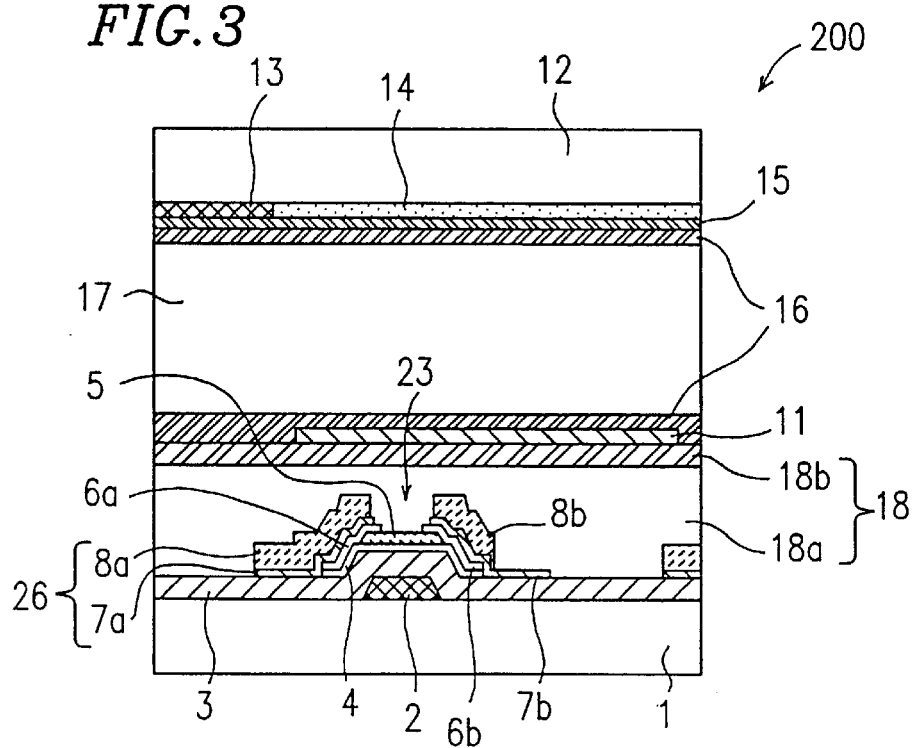
FIG. 3 is a cross-sectional view of the liquid crystal display device taken along line III—III of FIG. 1.

Referring initially to FIGS. 1 to 3, FIG. 1 is a schematic plan view of a liquid crystal display device using an active matrix substrate according to a preferred embodiment of the present invention. FIG. 2 is a cross-sectional view taken along line II—II of FIG. 1, and FIG. 3 is a cross-sectional view taken along line III—III of FIG. 1.

The active matrix substrate according to the present invention includes a plurality of gate bus lines 24 running parallel with one another and a plurality of source bus lines 26 running parallel with one another. The source bus lines 26 cross the gate bus lines 24 at substantially right angles on a transparent insulating substrate 1. The gate bus lines 24 function as a scanning line, and the source bus lines 26 function as a signal line. A pixel electrode 11 is provided for each rectangular region (surrounded by the adjacent gate bus lines 24 and the adjacent source bus lines 26) so as to form a matrix of the pixel electrodes. A branch extends from the gate bus line 24 at each region where the pixel electrode 11 is formed, so as to form a gate electrode 2 of a TFT 23 as a switching element. A gate insulating film 3 is formed so as to cover the gate electrodes 2, the gate bus lines 24, and the source bus lines 26.

Each TFT 23 is essentially composed of the gate electrode 2, the gate insulating film 3 covering the gate electrode 2, a semiconductor layer 4 formed on the portion of the gate insulating film 3 corresponding to the gate electrode 2, a channel protecting layer 5 formed on the center portion of the semiconductor layer 4, n+-Si layers 6a and 6b formed to cover the both sides of the channel protecting layer 5 and the exposed portions of the semiconductor layer 4, an ITO film 7a and a metal layer 8a sequentially formed on the n+-Si layer 6a, and an ITO film 7b and a metal layer 8b sequentially formed on the n+-Si layer 6b. The n+-Si layers 6a and 6b function as a source electrode and a drain electrode of each TFT 23, respectively. The ITO film 7a and the metal layer 8a function as the source bus lines 26 in combination.

The ITO film 7b and the metal layer 8b function as a connecting electrode in combination, so as to connect the drain electrode of each TFT 23 with each pixel electrode 11. The ITO film 7b extends to the portion above auxiliary capacitor signal lines 19 and an overlapped portion of the ITO film 7b, the gate insulating film 3 and the auxiliary capacitor signal lines 19 forms an auxiliary capacitor.

Furthermore, an interlayer insulating film 18 is formed so as to cover the TFTs 23, the gate bus lines 24, and the source bus lines 26. The interlayer insulating film 18 includes a first layer 18a and a second layer 18b in this order from the substrate side. The first layer 18a contains benzocyclobutene (hereinafter, referred to as "BCB"). The second layer 18b contains silicon dioxide obtained by an oxygen plasma treatment of one surface of the first layer 18a. BCB is represented by Formula (I) below. BCB can be synthesized by any suitable method. Alternatively, BCB is commercially available (e.g., Cyclotene™ manufactured by The Dow Chemical Company).

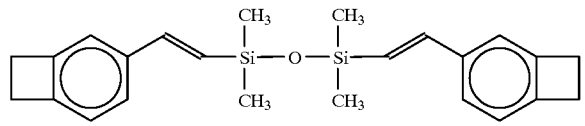

(I)

A transparent conductive film 11 which functions as pixel electrodes is formed on the interlayer insulating film 18. Each pixel electrode is electrically connected with the drain electrode 6b of each TFT 23 via a contact hole 10 penetrating the interlayer insulating film 18 and the ITO film 7b. Furthermore, an alignment film 16 is provided on the entire surface of the substrate so as to cover the pixel electrodes 11.

A liquid crystal display device 200 includes the active matrix substrate and a color filter substrate provided with a light shielding plate 13, a color filter 14, a counter electrode 15 and an alignment film 16 on a transparent insulating substrate 12. The active matrix substrate and the color filter substrate are arranged opposing each other, and a liquid crystal layer 17 including a liquid crystal as a display medium is provided therebetween.

Hereinafter, referring to FIGS. 4A to 4D, a preferred method for fabricating such an active matrix substrate will be described. For simplicity, FIGS. 4A to 4D show only a portion corresponding to a cross-section taken along line II—II of FIG. 1.

First, TFTs 23, gate bus lines 24 and source bus lines 26 are formed on a transparent insulating substrate made of glass, plastic or the like. The procedure is as follows.

Figure 4A:
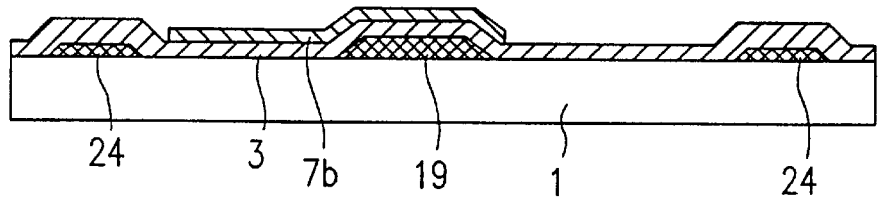
FIGS. 4A to 4D are schematic cross sectional views illustrating a preferred embodiment of a method for fabricating the active matrix substrate according to the present invention.

Referring initially to FIG. 4A, metal for the gate bus lines 24 is deposited by sputtering, electron beam evaporation, or the like, and patterned into a predetermined shape by photolithography, etching, and the like, so as to form the plurality of parallel gate bus lines 24, the gate electrodes 2 branched from the gate bus lines 24 and the auxiliary capacitor lines 19. Examples of such metal include tantalum (Ta), titanium (Ti), aluminum (Al), and chromium (Cr). Then, the gate insulating film 3 made of $SiN_x$, $SiO_x$ or the like is formed over the entire surface of the substrate with the gate bus lines 24, the gate electrodes 2 and the auxiliary capacitor lines 19 formed thereon.

The semiconductor layer 4 made of non-doped amorphous silicon (a-Si) or the like is then formed on the gate insulating film 3 by plasma CVD or the like. Thereafter, $SiN_x$ is deposited on the semiconductor layer 4 by plasma CVD, for example, and patterned so as to leave the $SiN_x$ only above the top portions of the gate electrodes 2 unremoved, to form the channel protecting layer 5.

Then, $n^+$-Si layers 6a and 6b are formed on the channel protecting layer 5. The $n^+$-Si layers 6a and 6b function as a source electrode and a drain electrode of each TFT 23, respectively. For example, amorphous silicon doped with phosphorus ($n^+$-Si) is deposited on the channel protecting layer 5 by plasma CVD or the like and patterned into a predetermined shape by etching or the like, so as to form $n^+$-Si layers 6a and 6b.

Furthermore, a material (e.g., ITO) for the transparent conductive films 7a and 7b and metal for the metal layers 8a and 8b are sequentially deposited by sputtering or the like, and then patterned into a predetermined shape by etching or the like, so as to form the transparent conductive films 7a and 7b and the metal layers 8a and 8b. Examples of such metal include tantalum (Ta), titanium (Ti), aluminum (Al), and chromium (Cr). The transparent conductive film 7a and the metal layer 8a constitute the source bus lines 26, and the transparent conductive film 7b and the metal layer 8b constitute the connecting electrode. The metal layer 8a alone may constitute the source bus lines 26, however, it is preferable that the transparent conductive film (ITO film) 7a and the metal layer 8a constitute the source bus lines 26 in combination. The combination of the ITO film and the metal layer makes it possible to reduce disconnection of the source bus line. This is because one of them can be electrically connected even though the other may have defects. Furthermore, in the present invention, since the source bus lines and the connecting electrode can be formed simultaneously, the fabrication process of the active matrix substrate is simplified.

Thereafter, the interlayer insulating film 18 is formed on the substrate with TFTs 23, the gate bus lines 24 and the source bus lines 26 formed thereon. The procedure is as follows.

Figure 4B:
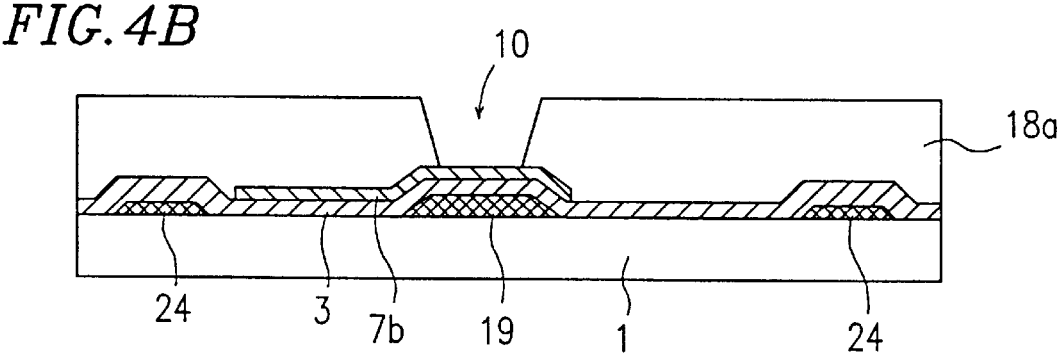

Photosensitive BCB is applied by spin coating onto the substrate with TFTs 23, the gate bus lines 24 and the source bus lines 26 formed thereon. The thickness of the applied BCB is preferably about 2 μm to about 4 μm, and more preferably about 2.5 μm to about 3.5 μm. A predetermined portion of the applied BCB is exposed to light, and the exposed BCB is developed and thermally cured so as to form the first layer 18a and contact holes 10 penetrating the first layer, as shown in FIG. 4B. Any appropriate conditions can be employed for exposing, developing and thermally curing BCB. For example, the exposure may be performed by irradiating BCB with light (e.g., i-line) at the intensity of 300 to 500 mW/cm$^2$; the development may be performed by immersing the substrate with BCB applied thereto into a predetermined developer for 1 to 2 minutes; and the curing may be performed at temperature of 250° C. for 60 minutes.

Since BCB is removed at the time of forming the contact holes, BCB does not exist in the contact holes in the subsequent oxygen plasma treatment. In other words, silicon dioxide is not produced in the contact holes even though the oxygen plasma treatment is performed. Therefore, the removal of silicon dioxide in the contact holes is not required. As a result, the fabrication process of the interlayer insulating film having double-layered structure (and therefore, the fabrication process of the active matrix substrate) can be remarkably simplified.

Figure 4C:
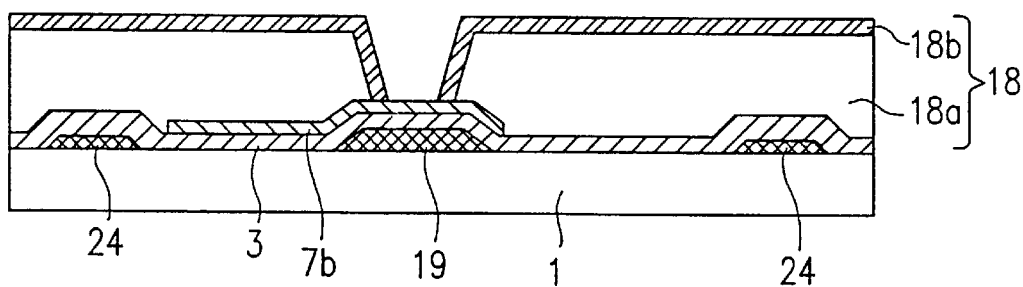

Thereafter, in FIG. 4C, the surface of the first layer 18a is treated with oxygen plasma so as to form the second layer 18b containing silicon dioxide. As to the conditions for an oxygen plasma treatment, any appropriate conditions can be employed. Typically, the oxygen plasma treatment is performed under the following conditions: $O_2$ gas partial pressure of 0.5 Torr; RF power of 50 W; a temperature of 150° C.; and time of 15 minutes. The thickness of the second layer to be formed is preferably about 40 nm to about 60 nm, and more preferably about 50 nm.

Figure 4D:
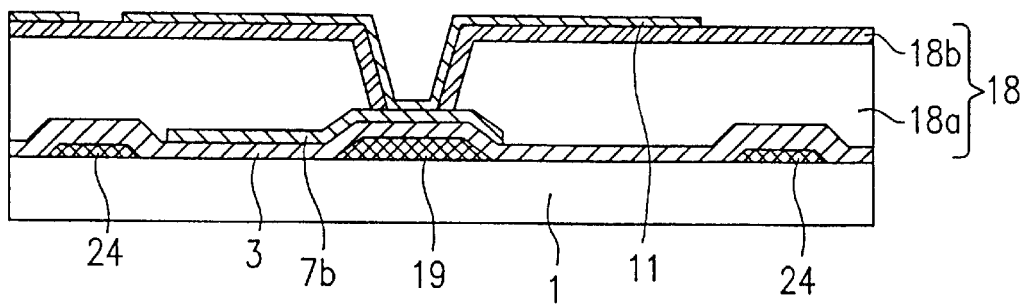
Figure 5:
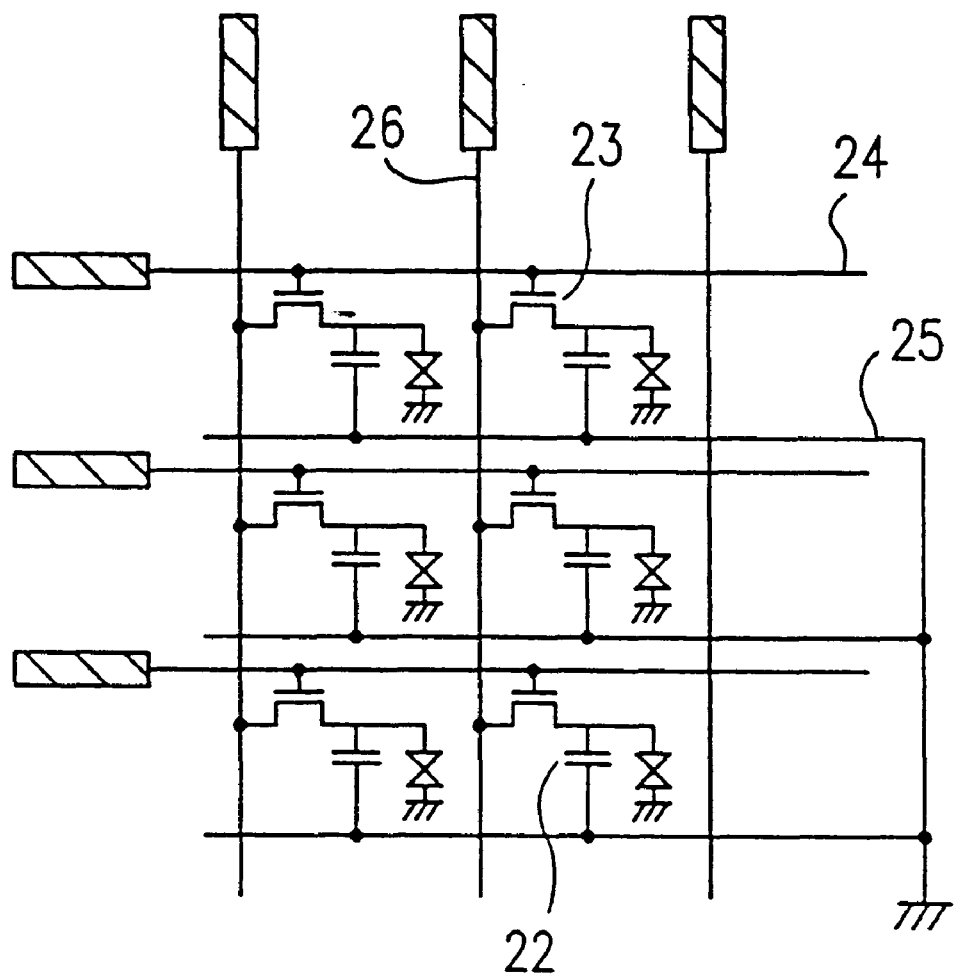
FIG. 5 is a schematic view illustrating an exemplary configuration of a conventional active matrix substrate.
Figure 6:
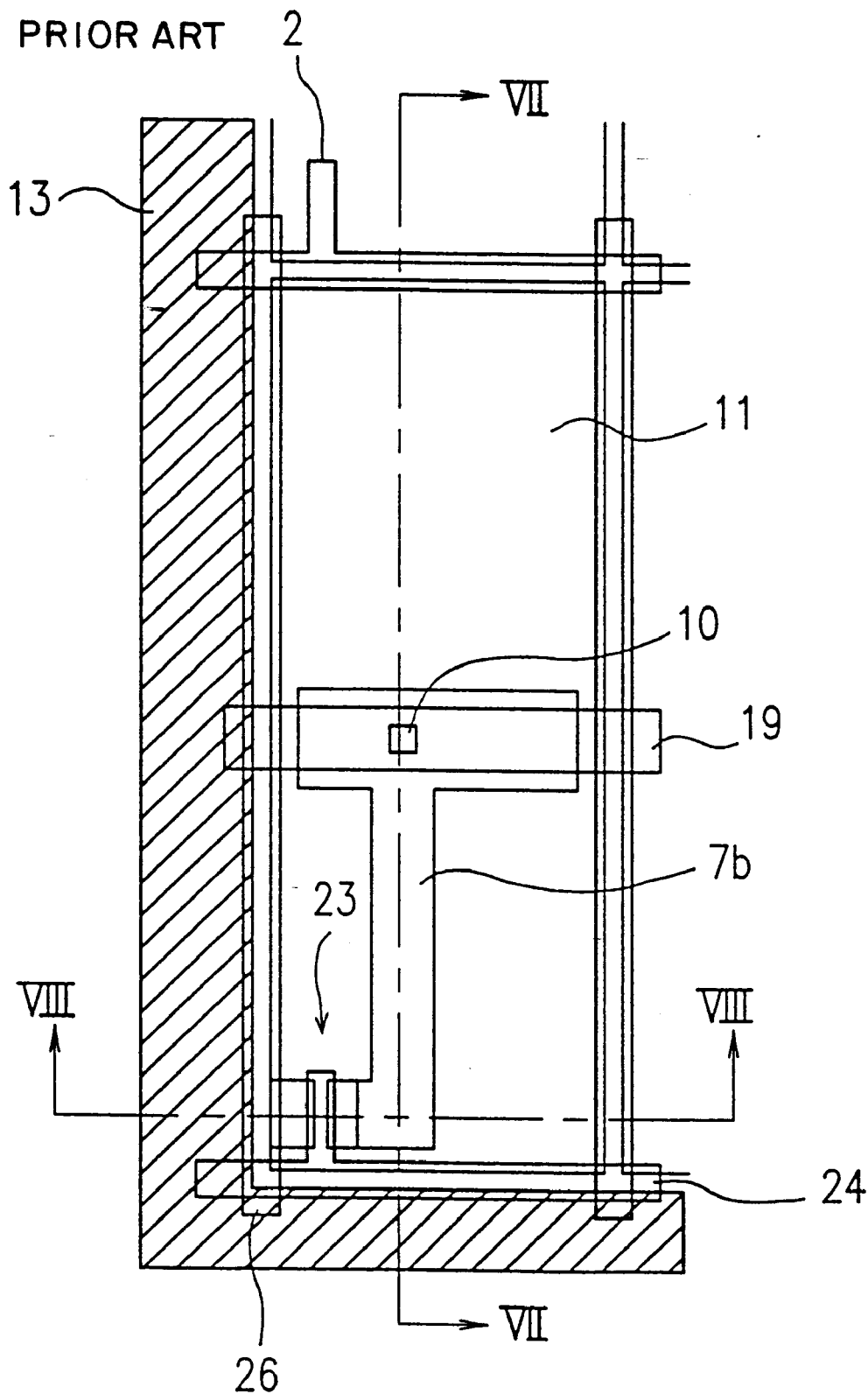
FIG. 6 is a schematic plan view of a liquid crystal display device using a conventional active matrix substrate.
Figure 7:
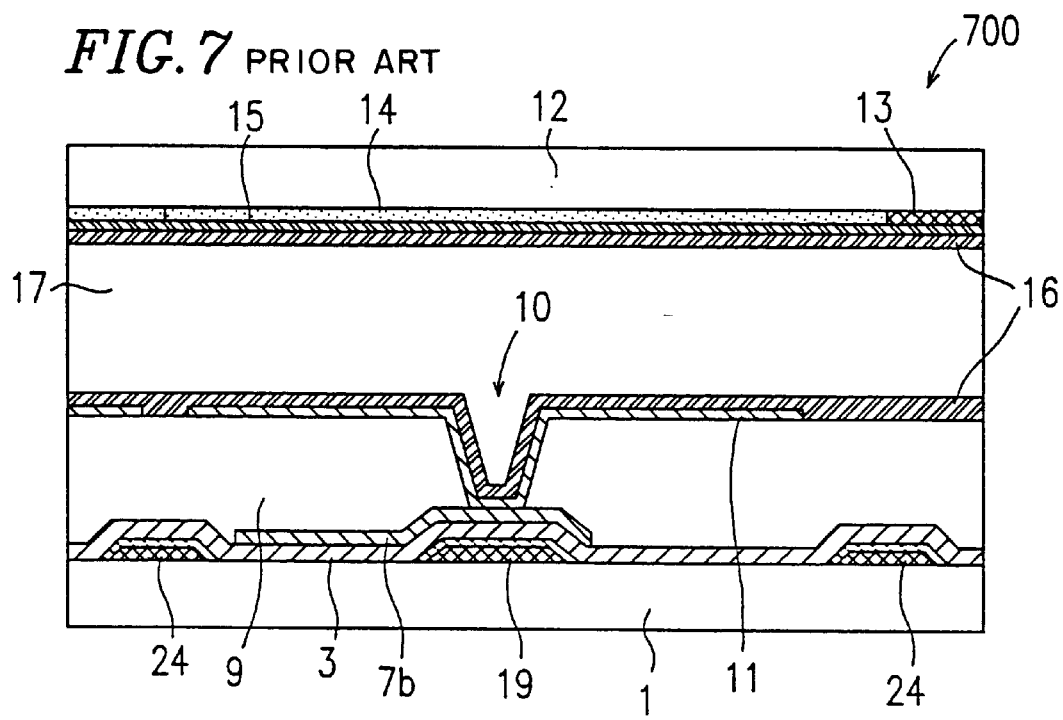
FIG. 7 is a cross-sectional view of the liquid crystal display device taken along line VII—VII of FIG. 6.
Figure 8:
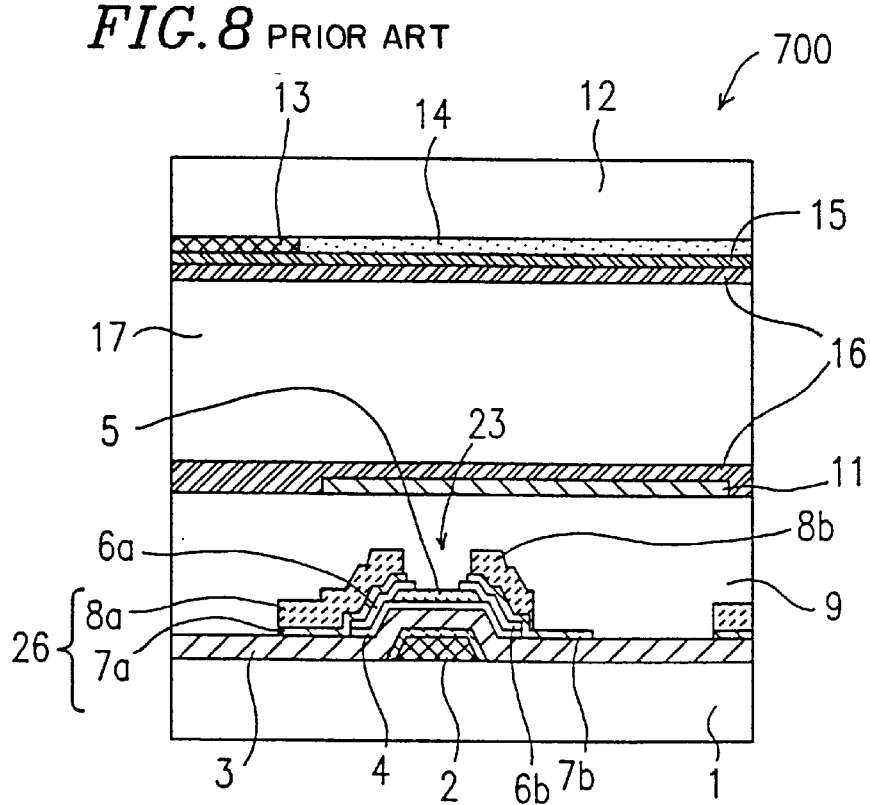
FIG. 8 is a cross-sectional view of the liquid crystal display device taken along line VIII—VIII of FIG. 6.

Thereafter, in FIG. 4D, material for the transparent conductive film 11 (e.g., ITO) is deposited by sputtering or the like, and patterned into a predetermined shape by etching or the like, so as to form the transparent conductive film 11. The transparent conductive film 11 functions as pixel electrodes. Each pixel electrode 11 is electrically connected with the drain electrode 6b of each TFT 23 via a contact hole 10 penetrating the interlayer insulating film 18 and the ITO film 7b.

As described above, the active matrix substrate is fabricated.

On the other hand, the color filter substrate is fabricated by any suitable method. For example, suitable metal (e.g., Cr, $CrO_2$) is deposited by sputtering or the like, and patterned into a predetermined shape by photolithography, etching, or the like, so as to form the light shielding plate 13. Photosensitive color resist is then applied onto the predetermined portions of the substrate with the light shielding plate formed thereon, exposed to light and developed, so as to form pixels of red (R), green (G) and blue (B) in a predetermined arrangement. Thus, the color filter 14 is provided on the substrate 12. Furthermore, ITO is deposited by sputtering so as to form the counter electrode 15, fabricating the color filter substrate.

The alignment films 16 are formed on both of the active matrix substrate and the color filter substrate. The active matrix substrate and the color filter substrate are then attached with a predetermined gap. Furthermore, liquid crystal is injected into the gap so as to complete the liquid crystal display device.

According to the active matrix substrate of this embodiment, the interlayer insulating film 18 includes a first layer 18a containing organic insulating material (BCB) and a second layer 18b containing inorganic insulating material (silicon dioxide) formed on the first layer. As a result, separation of the interlayer insulating film 18 and the pixel electrodes 11 is not caused.

Furthermore, the interlayer insulating film 18 can be formed in only two steps (i.e., a photolithography step of the first layer including application, exposure, development and curing, and an oxygen plasma treatment step of the surface of the first layer). In contrast, according to conventional active matrix substrates using a combination of an organic and an inorganic insulating films as an interlayer insulating film, the formation of the interlayer insulating film requires six steps (as described above). Accordingly, since the active matrix substrate of the present invention can be fabricated by a substantially simplified method, fabrication cost can be greatly reduced.

In a preferred embodiment of the invention, the oxygen plasma treatment can be performed just before forming the ITO film in the apparatus for forming the ITO film. In this case, since the fabrication process can be further simplified, fabrication cost can be further reduced.

Furthermore, since the active matrix substrate according to the present invention is provided with an interlayer insulating film between the gate and source bus lines and the pixel electrodes, the pixel electrodes can be formed on the portion of the interlayer insulating film corresponding to the portion where the gate and source bus lines are formed. Furthermore, electric fields due to the gate and source bus lines can be shielded with the interlayer insulating film. As a result, a liquid crystal display device using the active matrix substrate of the present invention has a high aperture ratio and a satisfactory liquid crystal alignment.

EMBODIMENT 2

An active matrix substrate of this embodiment is the same as that of embodiment 1 except that the first layer 18a of the interlayer insulating film 18 contains photosensitive resin (e.g., acrylic resin) and the second layer 18b includes silicon dioxide obtained by an oxygen plasma treatment of silazane compound applied onto the surface of the first layer. Any suitable photosensitive resin can be used for the first layer 18a. For simplicity, an interlayer insulating film 18 having a first layer 18a containing acrylic resin will be described below.

The first and second layers 18a and 18b of the interlayer insulating film 18 are formed, for example, in the following manner.

Photosensitive acrylic resin is applied by spin coating onto the substrate with TFTs 23, the gate bus lines 24 and the source bus lines 26 formed thereon. The thickness of the applied acrylic resin is preferably about 2 μm to about 4 μm, and more preferably about 2.5 μm to about 3.5 μm. A predetermined portion of the applied acrylic resin is exposed to light, and the exposed acrylic resin is developed and thermally cured so as to form the first layer 18a and contact holes 10 penetrating the first layer. Any appropriate conditions can be employed for exposing, developing and thermally curing the acrylic resin. For example, the exposure may be performed by irradiating acrylic resin with light (e.g., g-line, h-line) at the intensity of 140 to 200 mW/cm$^2$; the development may be performed by immersing the substrate with acrylic resin applied thereto into a predetermined developer (e.g., TMAH) for 1 to 4 minutes; and the curing may be performed at temperature of 200 to 220° C. for 30 to 60 minutes.

Thereafter, silazane compound is applied onto the surface of the first layer 18a, and the applied silazane compound is treated with oxygen plasma so as to form the second layer 18b containing silicon dioxide on the first layer 18a. Examples of silazane compound include disilazane compound, cyclosilazane compound and polycyclosilazane compound. Disilazane compound is preferred and hexamethyldisilazane (hereinafter, referred to as "HMDS") is especially preferred. As to the conditions for an oxygen plasma treatment, any appropriate conditions can be employed. Typically, the oxygen plasma treatment is performed under the following conditions: $O_2$ gas partial pressure of 0.5 Torr; RF power of 50 W; a temperature of 150° C.; and time of 15 minutes. The thickness of the second layer to be formed is preferably about 40 nm to about 60 nm, and more preferably about 50 nm.

Furthermore, silicon dioxide produced in the contact holes 10 is removed by photolithography and etching so as to form the interlayer insulating film 18.

According to the active matrix substrate of this embodiment, the interlayer insulating film 18 includes a first layer 18a containing organic insulating material (acrylic resin) and a second layer 18b containing inorganic insulating material (silicon dioxide) formed on the first layer. As a result, separation of the interlayer insulating film 18 and the pixel electrodes 11 is not caused.

Furthermore, the interlayer insulating film 18 can be formed by the procedure including a photolithography of the first layer, an application and an oxygen plasma treatment of silazane compound, and a removal (i.e., photolithography and etching) of unnecessary silicon dioxide. More specifically, the interlayer insulating film 18 can be formed by five steps. Therefore, the fabrication process can be simplified compared to that of conventional active matrix substrate. In addition, an application and an oxygen plasma treatment of silazane compound can be performed in markedly simplified manner as compared to photolithography and etching. As a result, the fabrication cost of the active matrix substrate can be reduced.

In a preferred embodiment of the invention, the application of silazane compound can be performed just before or immediately after thermally curing acrylic resin in the photolithography step of the first layer. In this case, since the fabrication process can be further simplified, the fabrication cost can be further reduced.

Furthermore, since the active matrix substrate according to the present invention is provided with an interlayer insulating film between the gate and source bus lines and the pixel electrodes, the pixel electrodes can be formed on the portion of the interlayer insulating film corresponding to the portion where the gate and source bus lines are formed. Furthermore, electric fields due to the gate and source bus lines can be shielded with the interlayer insulating film. As a result, a liquid crystal display device using the active matrix substrate of the present invention has a high aperture ratio and a satisfactory liquid crystal alignment.

Hereinafter, functions of the present invention will be described.

An active matrix substrate according to the present invention is provided with an interlayer insulating film having a first layer containing organic insulating material (BCB or photosensitive resin such as acrylic resin) and a second layer containing inorganic insulating material (silicon dioxide) formed on the first layer. Therefore, separation of the interlayer insulating film and the pixel electrodes is not caused. This is because adhesion of the second layer to the pixel electrodes is excellent. As a result, the active matrix of the present invention can be fabricated with high yield. Furthermore, since the interlayer insulating film is provided between the gate and source bus lines and the pixel electrodes, the pixel electrodes can be formed on the portion of the interlayer insulating film corresponding to the portion where the gate and source bus lines are formed. As a result, a liquid crystal display device having a high aperture ratio can be obtained. In addition, defects of a liquid crystal alignment can be prevented by shielding electric fields due to the gate and source bus lines with the interlayer insulating film. As described above, according to the present invention, an active matrix substrate capable of realizing a liquid crystal display device having a high aperture ratio and a satisfactory liquid crystal alignment can be obtained inexpensively.

In the case where the first layer contains BCB, the second layer (silicon dioxide layer) is formed only by treating the surface of the first layer with oxygen plasma. Furthermore, since BCB is removed at the time of forming the contact holes, BCB does not exist in the contact holes in the oxygen plasma treatment. In other words, silicon dioxide is not produced in the contact holes even though the oxygen plasma treatment is performed. Therefore, since the removal of silicon dioxide in the contact holes is not required, the fabrication process of the active matrix substrate can be remarkably simplified. As a result, the fabrication cost can be greatly reduced.

In a preferred embodiment, the oxygen plasma treatment of the surface of the BCB layer can be performed just before forming the ITO film in the apparatus for forming the ITO film. In this case, since the fabrication process can be further simplified, the fabrication cost can be further reduced.

In the case where the first layer contains photosensitive resin (e.g., acrylic resin), the second layer (silicon dioxide layer) is formed by applying silazane compound (preferably HMDS) onto the surface of the first layer and treating the applied silazane compound with oxygen plasma. This fabrication method can reduce the fabrication steps as compared to conventional methods. Furthermore, the application and the oxygen plasma treatment of silazane compound can be performed in markedly simplified manner as compared to photolithography and etching. Therefore, the fabrication process of the active matrix substrate can be simplified. As a result, the fabrication cost of the active matrix substrate can be reduced.

In a preferred embodiment, the application of silazane compound can be performed just before or immediately after thermally curing acrylic resin in the photolithography step of the first layer. In this case, since the fabrication process can be further simplified, the fabrication cost can be further reduced.

As described above, the present invention makes it possible to provide an active matrix substrate capable of realizing a liquid crystal display device having a high aperture ratio and a satisfactory liquid crystal alignment, and a method for easily and inexpensively fabricating such an active matrix substrate.

An active matrix substrate according to the present invention can be preferably incorporated into a liquid crystal display device used for a plane display for a television set, a personal computer, office automation (OA) equipment and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate comprising:
   an insulating substrate,
   scanning bus lines and signal bus lines provided on the insulating substrate so as to cross each other,
   switching elements provided in the vicinity of crossing portions of the scanning bus lines and the signal bus lines,
   an interlayer insulating film covering the switching elements, the scanning bus lines and the signal bus lines, and
   pixel electrodes provided on the surface of the interlayer insulating film opposite to the insulating substrate, each of the pixel electrodes being electrically connected with each of the switching elements via a contact hole penetrating the interlayer insulating film,
   wherein the interlayer insulating film comprises a first layer containing benzocyclobutene and a second layer containing silicon dioxide.

2. An active matrix substrate according to claim 1, wherein the second layer containing silicon dioxide is provided on a side wall of the contact hole.

3. An active matrix substrate comprising:
   an insulating substrate,
   scanning bus lines and signal bus lines provided on the insulating substrate so as to cross each other,
   switching elements provided in the vicinity of crossing portions of the scanning bus lines and the signal bus lines,
   an interlayer insulating film covering the switching elements, the scanning bus lines and the signal bus lines, and
   pixel electrodes provided on the surface of the interlayer insulating film opposite to the insulating substrate, each of the pixel electrodes being electrically connected with each of the switching elements via a contact hole penetrating the interlayer insulating film,
   wherein the interlayer insulating film comprises a first layer containing photosensitive resin and a second layer containing silicon dioxide.

4. An active matrix substrate according to claim 3, wherein the silazane compound is hexamethyldisilazane.

5. An active matrix substrate according to claim 3, wherein the photosensitive resin is acrylic resin.

6. An active matrix substrate according to claim 3, wherein the silazane compound is hexamethyldisilazane and the photosensitive resin is acrylic resin.

7. An active matrix substrate according to claim 3 wherein the second layer containing silicon dioxide is provided on a side wall of the contact hole.

8. An active matrix substrate according to claim 3, wherein benzocyclobutene contained in the first layer has photosensitivity.

9. An active matrix substrate according to claim 3, wherein a thickness of the second layer containing silicon dioxide is less than about 60 nm.

10. An active matrix substrate according to claim 3, wherein a thickness of the second layer containing silicon dioxide is about 40 nm to about 60 nm.

11. A method for fabricating an active matrix substrate comprising the steps of:
    forming scanning bus lines, signal bus lines and switching elements on an insulating substrate,
    applying benzocyclobutene onto the insulating substrate, exposing predetermined portions of the applied benzocyclobutene to light, and developing and thermally curing the exposed benzocyclobutene so as to form a first layer covering the scanning bus lines, the signal bus lines and the switching elements, and contact holes penetrating the first layer,
    treating the surface of the first layer with oxygen plasma to form a second layer containing silicon dioxide so as to obtain an interlayer insulating film having a double-layered structure, and
    forming pixel electrodes on the surface of the interlayer insulating film opposite to the insulating substrate so as to be connected with the switching elements via the contact holes.

12. A method for fabricating an active matrix substrate according to claim 11, wherein the oxygen plasma treatment is performed in an apparatus for forming the pixel electrodes.

13. A method for fabricating an active matrix substrate comprising the steps of:

forming scanning bus lines, signal bus lines and switching elements on an insulating substrate, applying photosensitive resin onto the insulating substrate, exposing predetermined portions of the applied photosensitive resin to light, and developing and thermally curing the exposed photosensitive resin so as to form a first layer covering the scanning bus lines, the signal bus lines and the switching elements, and contact holes penetrating the first layer, applying silazane compound onto the surface of the first layer, and treating the silazane compound with oxygen plasma to form a second layer containing silicon dioxide so as to obtain an interlayer insulating film having a double-layered structure, and forming pixel electrodes on the surface of the interlayer insulating film opposite to the insulating substrate so as to be connected with the switching elements via the contact holes.

14. A method for fabricating an active matrix substrate according to claim 13, wherein the silazane compound is applied just before or immediately after thermally curing the photosensitive resin.

15. A method for fabricating an active matrix substrate according to claim 13, wherein the silazane compound is hexamethyldisilazane.

16. A method for fabricating an active matrix substrate according to claim 13, wherein the photosensitive resin is acrylic resin.

17. A method for fabricating an active matrix substrate according to claim 13, wherein the silazane compound is hexamethyldisilazane and the photosensitive resin is acrylic resin.

* * * * *